(12) United States Patent
Ishino

(10) Patent No.: US 12,417,342 B2
(45) Date of Patent: Sep. 16, 2025

(54) INFORMATION PROCESSING DEVICE AND NON-TRANSITORY RECORDING MEDIUM STORING AN INFORMATION PROCESSING PROGRAM

(71) Applicant: TOYOTA JIDOSHA KABUSHIKI KAISHA, Toyota (JP)

(72) Inventor: Yuma Ishino, Edogawa-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 18/211,626

(22) Filed: Jun. 20, 2023

(65) Prior Publication Data

US 2024/0028818 A1 Jan. 25, 2024

(30) Foreign Application Priority Data

Jul. 22, 2022 (JP) .................................. 2022-117576

(51) Int. Cl.
*G10L 15/26* (2006.01)
*G06F 40/169* (2020.01)

(52) U.S. Cl.
CPC ............ *G06F 40/169* (2020.01); *G10L 15/26* (2013.01)

(58) Field of Classification Search
CPC ......... G10L 15/26; G10L 25/51; G06F 40/35; G06F 40/169; G06F 40/242; H04L 51/02
USPC ........................................................ 704/235
See application file for complete search history.

(56) References Cited

U.S. PATENT DOCUMENTS

2016/0307571 A1* 10/2016 Mizumoto ............. G10L 25/51
2018/0181885 A1   6/2018 Higo et al.
2022/0200936 A1*  6/2022 Higgins ................. H04L 51/02

FOREIGN PATENT DOCUMENTS

JP          2018-106662 A          7/2018

\* cited by examiner

*Primary Examiner* — Md S Elahee
(74) *Attorney, Agent, or Firm* — Dinsmore & Shohl LLP

(57) ABSTRACT

An information processing device that is configured to: in a case of annotation of a machine learning model that estimates a state of a party to a conversation from speech data of the conversation, determine whether or not the speech data is an insufficient predetermined annotation candidate, and in a case in which it is determined that the speech data is an insufficient predetermined annotation candidate, request annotation from the party to the conversation, who is at least one of a speaker or a listener of the conversation.

2 Claims, 7 Drawing Sheets

INFORMATION PROCESSING DEVICE AND NON-TRANSITORY RECORDING MEDIUM STORING AN INFORMATION PROCESSING PROGRAM

CROSS-REFERENCE TO RELATED APPLICATION

This application is based on and claims priority under 35 USC 119 from Japanese Patent Application No. 2022-117576 filed on Jul. 22, 2022, the disclosure of which is incorporated by reference herein.

BACKGROUND

Technical Field

The present disclosure relates to an information processing device and a non-transitory recording medium storing an information processing program.

Related Art

Japanese Patent Application Laid-Open (JP-A) No. 2018-106662 proposes an information processing device including: a storage means configured to store plural learning data respectively in association with labels allocated to the plural learning data and attribute information corresponding to the labels; and a label determination means configured to determine, in relation to focused-on learning data, a label for the focused-on learning data, from among the plural learning data, based on plural labels corresponding to the focused-on learning data and the attribute information corresponding to the labels.

In a case of annotation of a machine learning model that estimates a state of a party to a conversation from speech data of the conversation, data of predetermined annotation candidates may not be collected.

Moreover, since a label is determined based on the subjective view of a user, annotation by a third party who does not participate in an actual conversation may not be able to be accurately performed, thereby promoting data insufficiency.

SUMMARY

An aspect of the present disclosure is an information processing device, that includes: a memory; and a processor coupled to the memory, the processor being configured to: in a case of annotation of a machine learning model that estimates a state of a party to a conversation from speech data of the conversation, determine whether or not the speech data is an insufficient predetermined annotation candidate, and in a case in which it is determined that the speech data is an insufficient predetermined annotation candidate, request annotation from the party to the conversation, who is at least one of a speaker or a listener of the conversation.

DETAILED DESCRIPTION

Figure 1:
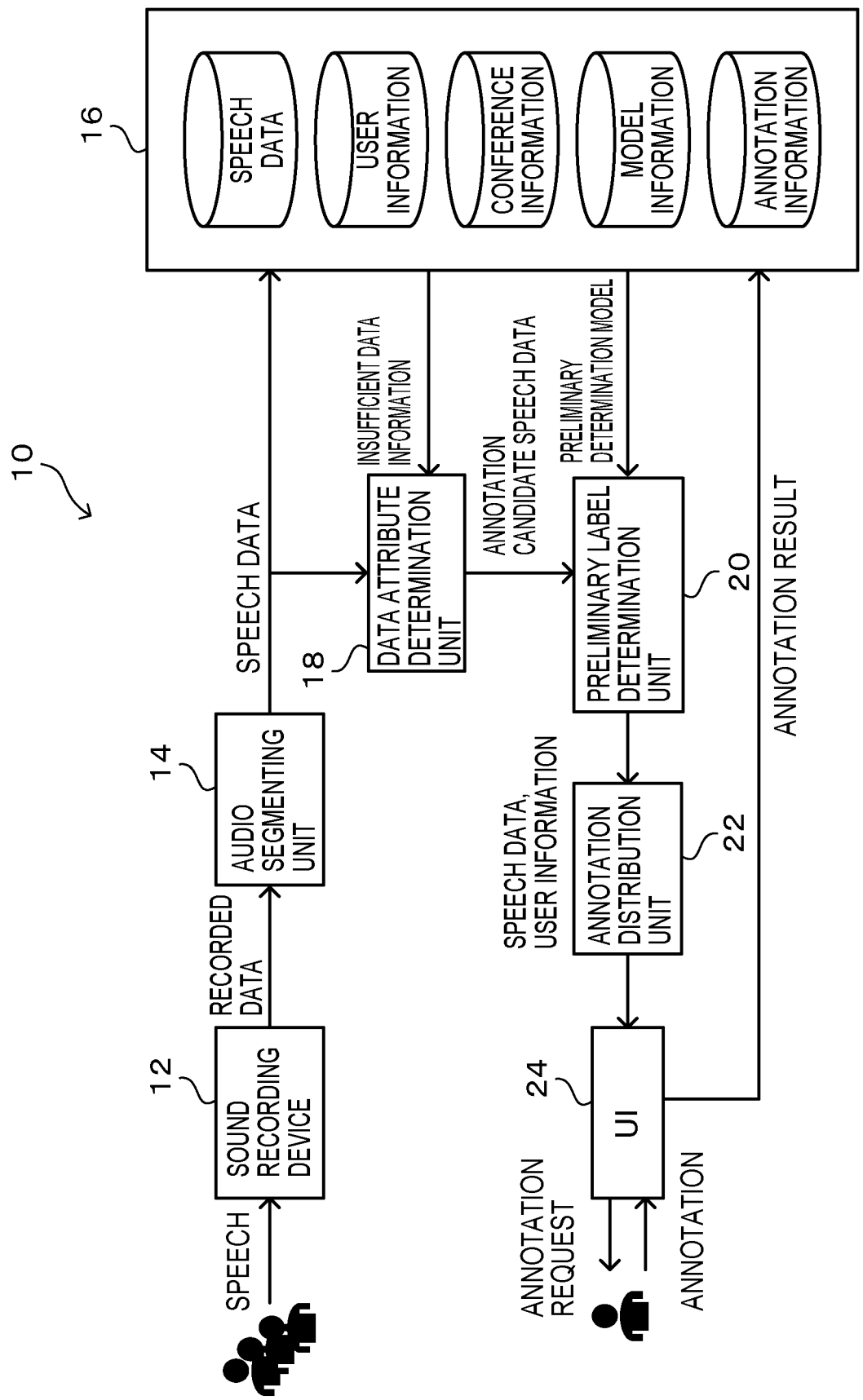
FIG. 1 is a diagram illustrating a schematic configuration of an information processing system according to an exemplary embodiment.

Detailed explanation follows regarding an exemplary embodiment of the present disclosure, with reference to the drawings. FIG. 1 is a diagram illustrating a schematic configuration of an information processing system according to an exemplary embodiment of the present disclosure.

An information processing system 10 according to the present exemplary embodiment is a system that performs annotation of a machine learning model that estimates a state of a party to a conversation from speech data of the conversation. More specifically, annotation of the machine learning model is performed by directly requesting annotation from a user present at a scene at which speech has been made.

As illustrated in FIG. 1, the information processing system 10 according to the present exemplary embodiment includes a sound recording device 12, an audio segmenting unit 14, a database (DB) 16, a data attribute determination unit 18, a preliminary label determination unit 20, an annotation distribution unit 22, and a user interface (UI) 24. Note that the data attribute determination unit 18 and the preliminary label determination unit 20 correspond to an example of a determination section, and the annotation distribution unit 22 corresponds to an example of a requesting section.

The sound recording device 12 sound-records or video-records audio from a conference or the like. The sound recording device 12 records audio and generates audio data when, for example, a user uses a service, web conferencing tools, or the like. More specifically, a video recording function or the like of web conferencing took may be used.

Since the audio data of the sound recording device 12 is audio data including many instances of speech from the start to the end of a conference, the audio segmenting unit 14 segments the audio data including a series of instances of speech into each instance of speech, and generates speech data in which audio is segmented into units of speech.

The DB 16 holds speech data, user information, conference information, model information, annotation results, and the like, and provides and holds information required during various processing.

The data attribute determination unit 18 determines an attribute of the speech data, such as a speaker name, with respect to the segmented speech data.

The preliminary label determination unit 20 provisionally determines whether or not an insufficient label is included in target speech data.

The annotation distribution unit 22 distributes the speech data to a user who is subject to an annotation request, and requests annotation.

The UI 24 notifies the user of the speech data selected as the annotation target, and the user plays back and checks the target speech data, and then performs annotation by selecting an appropriate label on the UI 24. The annotation results and the annotation information are stored in the DB 16 via the UI 24.

Figure 2:
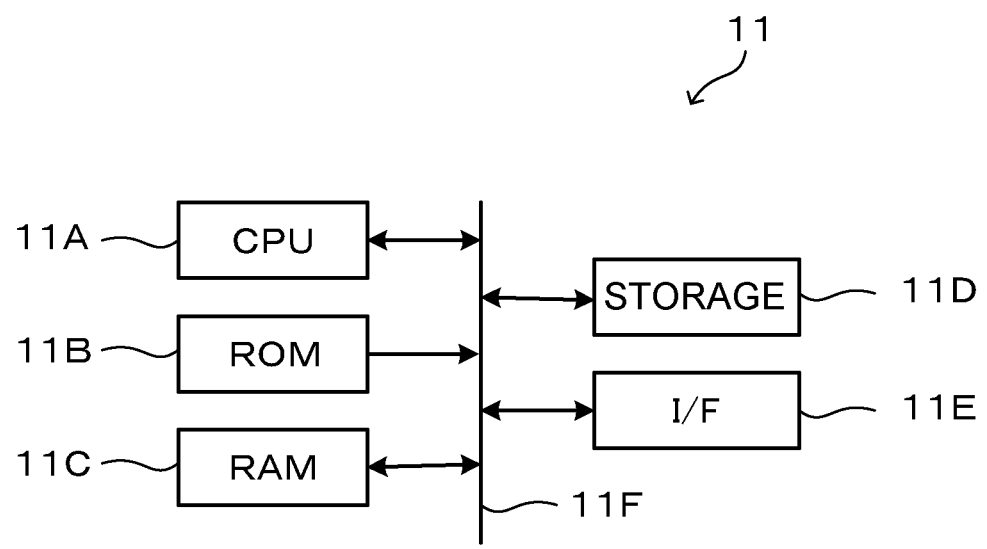
FIG. 2 is a block diagram illustrating a schematic configuration of a computer.

Note that explanation follows regarding, in the present exemplary embodiment, the audio segmenting unit 14, the DB 16, the data attribute determination unit 18, the preliminary label determination unit 20, and the annotation distribution unit 22 as functions executed by a computer 11 (see FIG. 2), such as a server, as an example of an information processing device. FIG. 2 is a block diagram illustrating a schematic configuration of a computer.

As illustrated in FIG. 2, the computer 11, such as a server, is configured by a general computer including a central processing unit (CPU) 11A, which is an example of a hardware processor, read only memory (ROM) 11B, random access memory (RAM) 11C, storage 11D, an interface (I/F) 11E, a bus 11F, and the like. The ROM 11B, the RAM 11C, and the storage 11D are examples of memory. The CPU 11A loads and executes, in the RAM 11C, a program such as an information processing program stored in the ROM 11B, thereby functioning as the audio segmenting unit 14, the data attribute determination unit 18, the preliminary label determination unit 20, the annotation distribution unit 22, and the DB 16.

Figure 3:
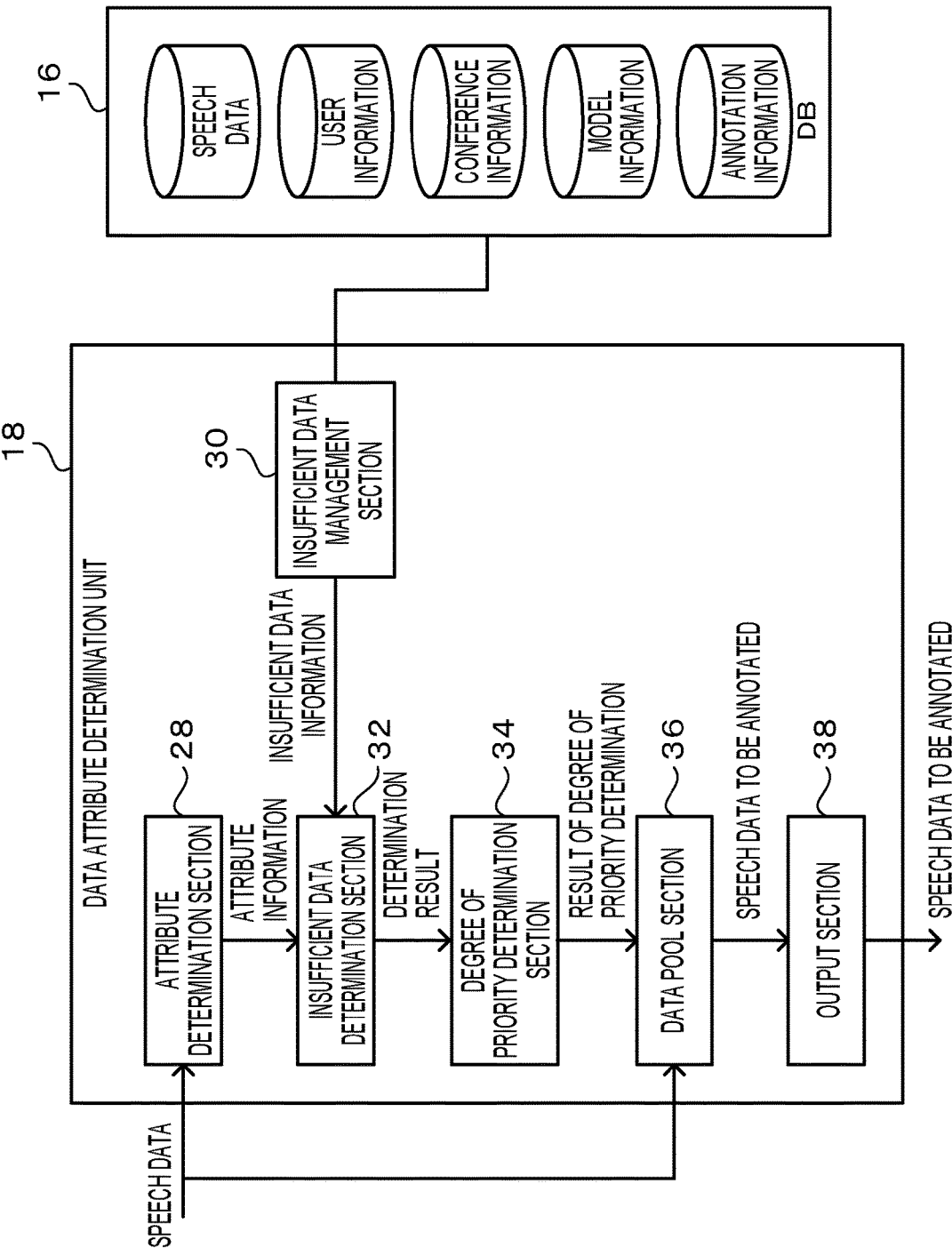
FIG. 3 is a block diagram illustrating a detailed configuration of a data attribute determination unit.

Next, detailed explanation follows regarding the data attribute determination unit 18. FIG. 3 is a block diagram illustrating a detailed configuration of the data attribute determination unit 18.

As illustrated in FIG. 3, the data attribute determination unit 18 includes functionality of an attribute determination section 28, an insufficient data management section 30, an insufficient data determination section 32, a degree of priority determination section 34, a data pool section 36, and an output section 38.

The attribute determination section 28 determines attributes of the input speech data. For example, the gender associated with the speech data may be determined as an attribute, or an individual may be specified by specifying a speaker name or the like. As an example, a method in which speaker identification of speech data is performed using technology to identify an individual, such as voiceprint authentication, or the like.

The insufficient data management section 30 holds attributes of learning data required for the machine learning model to be learned, based on information from the DB 16. More specifically, the target user of the model (who is the personal model for), the model accuracy, the state of progress of learning, and the like are held, and based on these pieces of information, information on insufficient data is generated.

The insufficient data determination section 32 checks the attribute information determined by the attribute determination section 28 against the insufficient data managed by the insufficient data management section 30, and determines whether or not the speech data corresponds to the insufficient data.

In a case in which the determination result of the insufficient data determination section 32 corresponds to insufficient data, the degree of priority determination section 34 compares annotation candidate data held in the data pool section 36 with a degree of priority. In a case in which the degree of priority is higher than annotation candidate data which is held in the data pool section 36, data having a lower degree of priority is replaced. This enables the upper limit amount of annotation to be controlled because if the amount of annotation is excessively large, the burden on the user becomes excessively large. Note that the higher the degree of insufficiency of insufficient data, the higher the degree of priority is set.

The data pool section 36 holds a predetermined number of annotation candidate data, and replaces the held annotation candidate data according to the determination of the degree of priority determination section 34.

The output section 38 outputs the speech data to be annotated which is held in the data pool section 36 after, for example, processing has been completed for all of the speech data during a conference.

Figure 4:
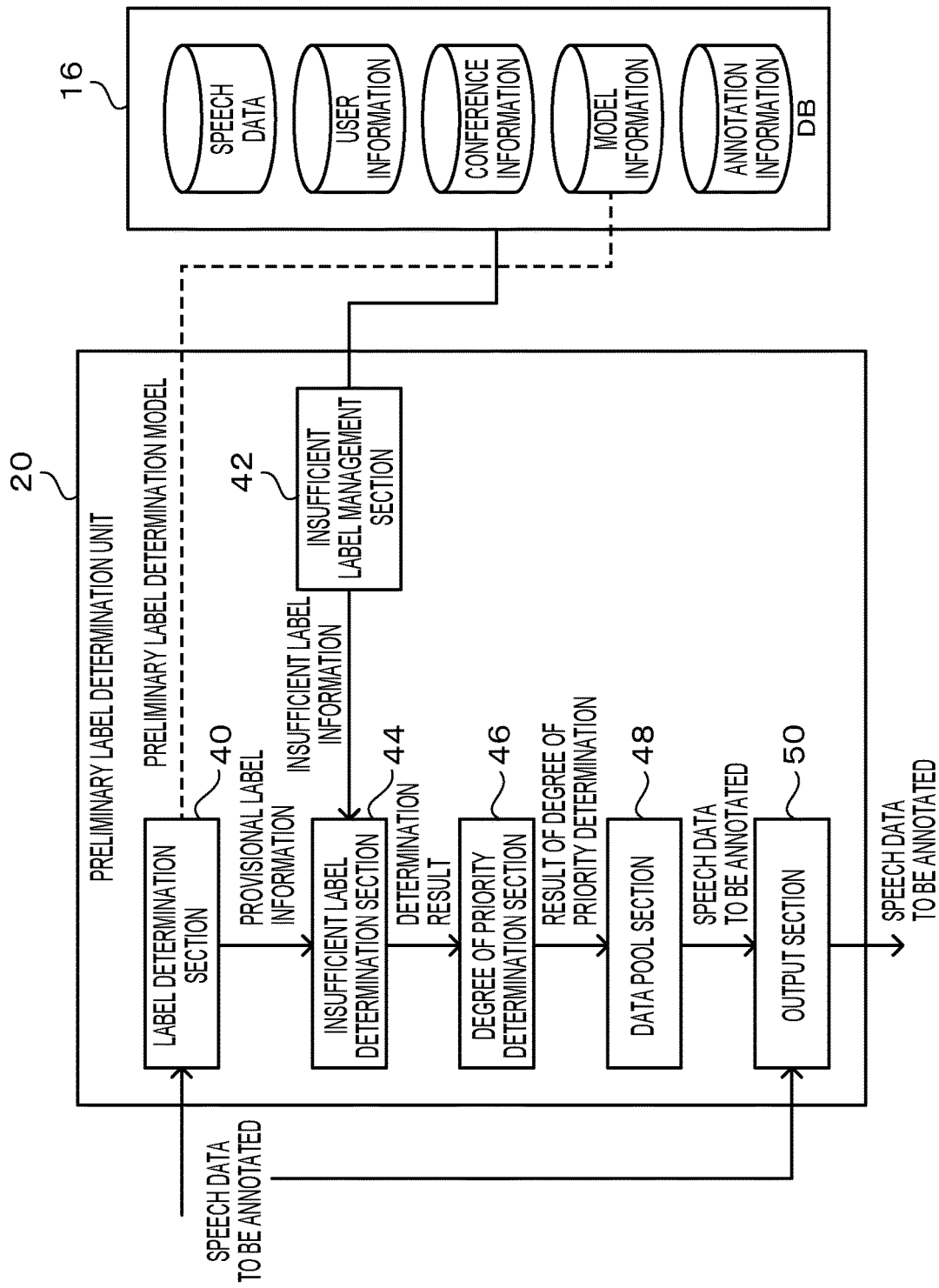
FIG. 4 is a block diagram illustrating a detailed configuration of a preliminary label determination unit.

Next, detailed explanation follows regarding the preliminary label determination unit 20. FIG. 4 is a block diagram illustrating a detailed configuration of the preliminary label determination unit 20.

As illustrated in FIG. 4, the preliminary label determination unit 20 includes functionality of a label determination section 40, which is as an example of a provisional label determination section, an insufficient label management section 42, an insufficient label determination section 44, a degree of priority determination section 46, a data pool section 48, and an output section 50.

The preliminary label determination unit 20 provisionally determines whether or not speech data of an annotation candidate has an insufficient label.

Using the model for preliminary label determination, the label determination section 40 provisionally determines the label of the input speech data to be annotated, and outputs this as provisional label information. The label determination section 40 may use a model capable of determining the label with the highest accuracy. Here, since it is sufficient to know that the target speech data is likely to be a required label, a model with low accuracy or a determination threshold value adjusted so as to be different from an actual application may be used.

The insufficient label management section 42 holds, in the machine learning model to be learned, a label with low determination accuracy as insufficient label information, based on the information in the DB 16.

The insufficient label determination section 44 compares the insufficient label information obtained from the insufficient label management section 42 with the provisional label information determined by the label determination section 40, and determines whether or not the speech data to be annotated corresponds to the insufficient label.

The degree of priority determination section 46 compares the speech data to be annotated which is held in the data pool section 48 with a degree of priority in a case in which the result of the determination performed by the insufficient label determination section 44 corresponds to an insufficient label, and in a case in which the degree of priority is higher than the speech data to be annotated which is held in the data pool section 48, data having a lower degree of priority is replaced. Note that the higher the degree of insufficiency of the insufficient label, the higher the degree of priority is set.

The data pool section 48 holds a predetermined number of speech data to be annotated and, according to the determination of the degree of priority determination section 46, replaces the held speech data to be annotated.

After processing has been completed for all of the speech data to be annotated, the output section 50 outputs the speech data to be annotated which is held in the data pool section 48.

Figure 5:
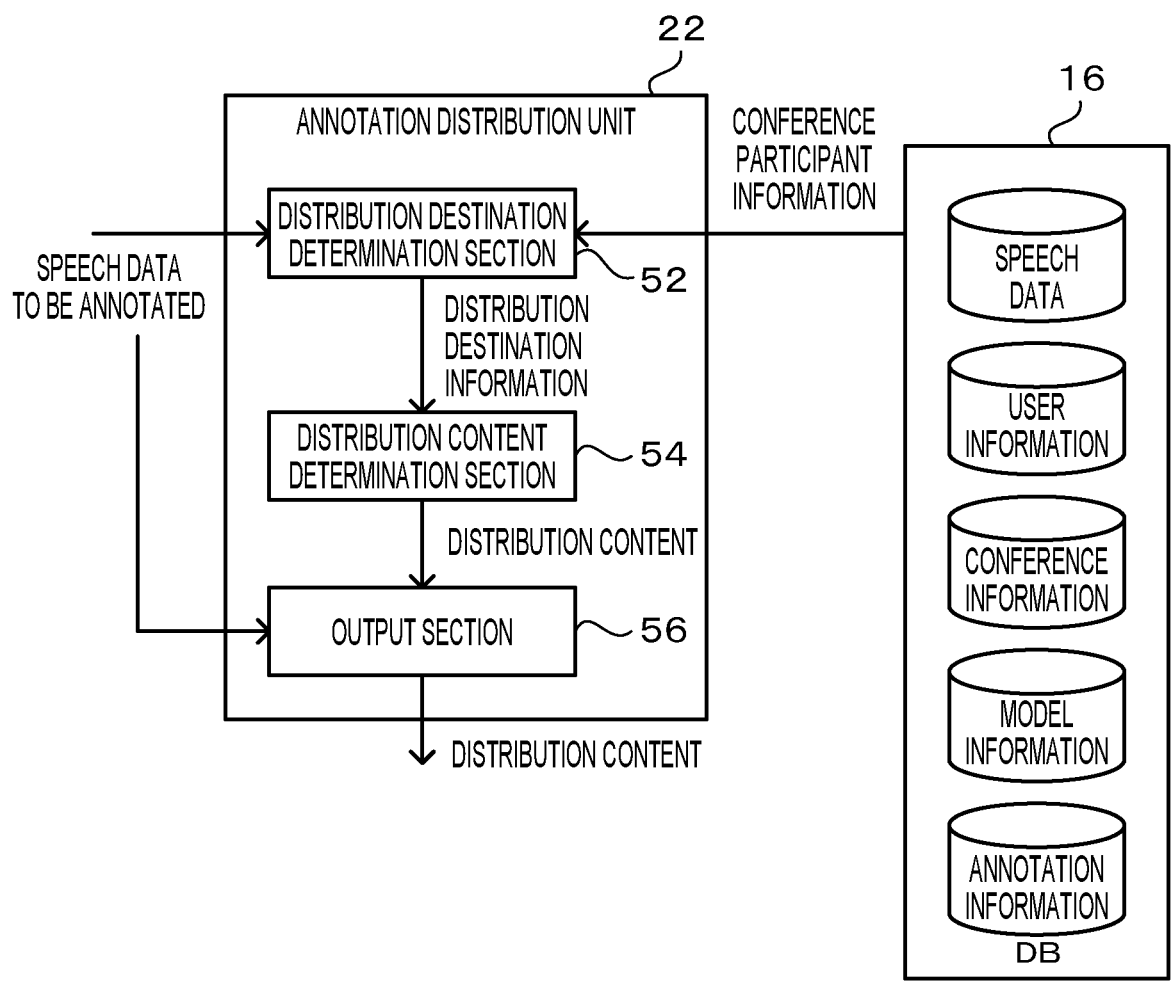
FIG. 5 is a block diagram illustrating a detailed configuration of an annotation distribution unit.

Next, detailed explanation follows regarding the annotation distribution unit 22. FIG. 5 is a block diagram illustrating a detailed configuration of the annotation distribution unit 22.

The annotation distribution unit 22 includes functionality of a distribution destination determination section 52, which is as an example of a determination section, a distribution content determination section 54, and an output section 56.

The distribution destination determination section 52 refers to conference participant information in the DB 16 to determine the conference participant who is the distribution destination of the speech data to be annotated. The distribution destination is determined in consideration of whether the model being learned is a speaker model, a listener model, or both. The distribution to the listener may be all or some of the conference participants. In a case of distribution to some of the conference participants, adjustment may be performed such that the amount of annotation is not unbalanced.

The distribution content determination section 54 determines the distribution content. For example, in a case of distributing to a speaker of an instance of speech and a listener who heard the instance of speech, an annotation request message is modified.

The output section 56 outputs the distribution content determined by the distribution content determination section 54 to the UI 24. As a specific distribution method, for example, a chat tool, a dedicated application, or the like is used.

The conference participant who received the annotation request plays back the speech data and replies with an appropriate label on the UI 24 such as a chat tool. For example, in a case in which the user wishes to annotate whether the instance of speech was positive, negative, or normal, a playback button of the speech data and selection buttons of the label corresponding to positive, negative, and normal are displayed on the UI 24 of the chat tool. The conference participant then operates the relevant selection button to execute the annotation. The annotation causes the acquired label to be saved in the DB 16 as annotation information in association with the speech data or the annotation implementer.

Figure 6A:
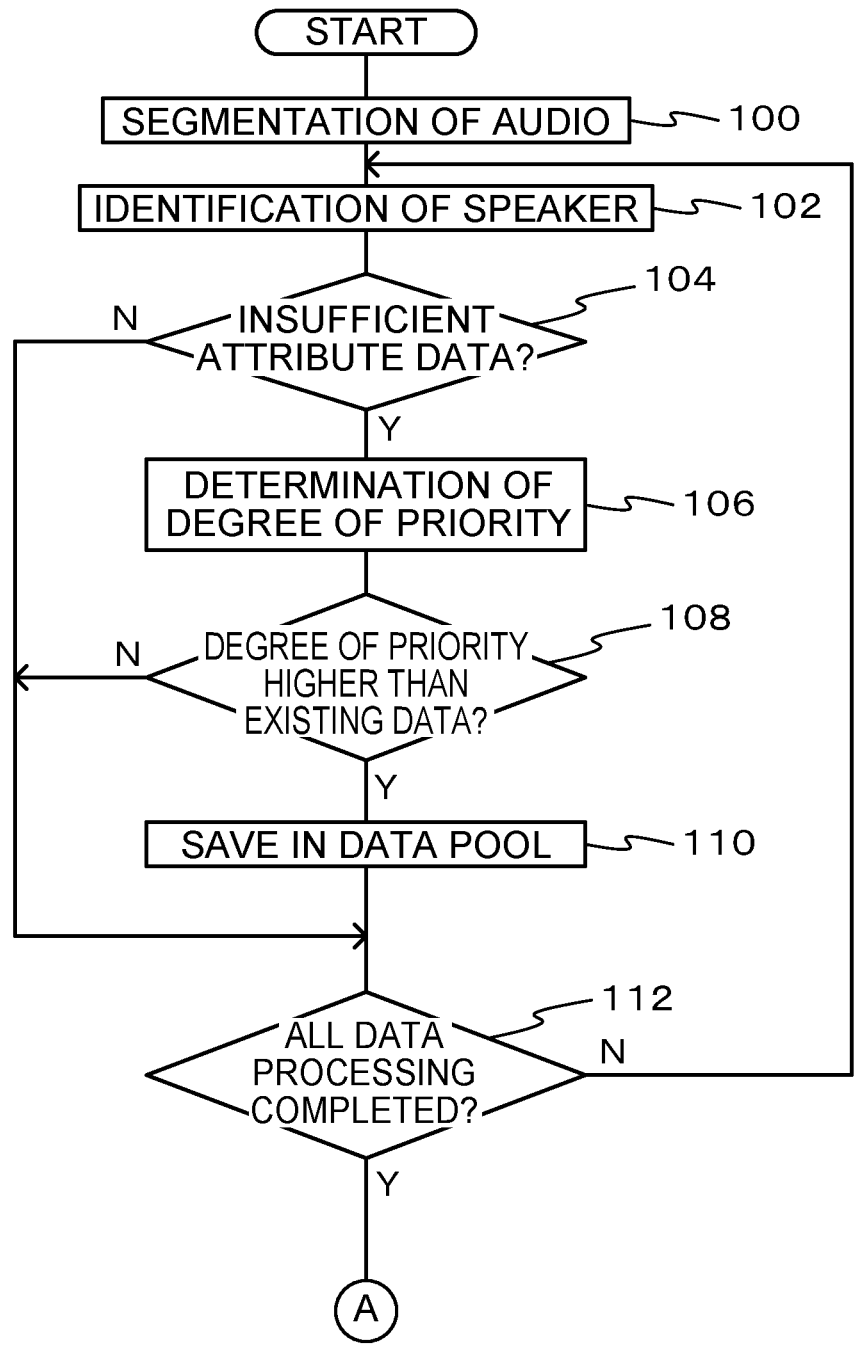
FIG. 6A is a first part flowchart of a flow illustrating an example of a flow of processing performed by a computer of an information processing system according to an exemplary embodiment.
Figure 6B:
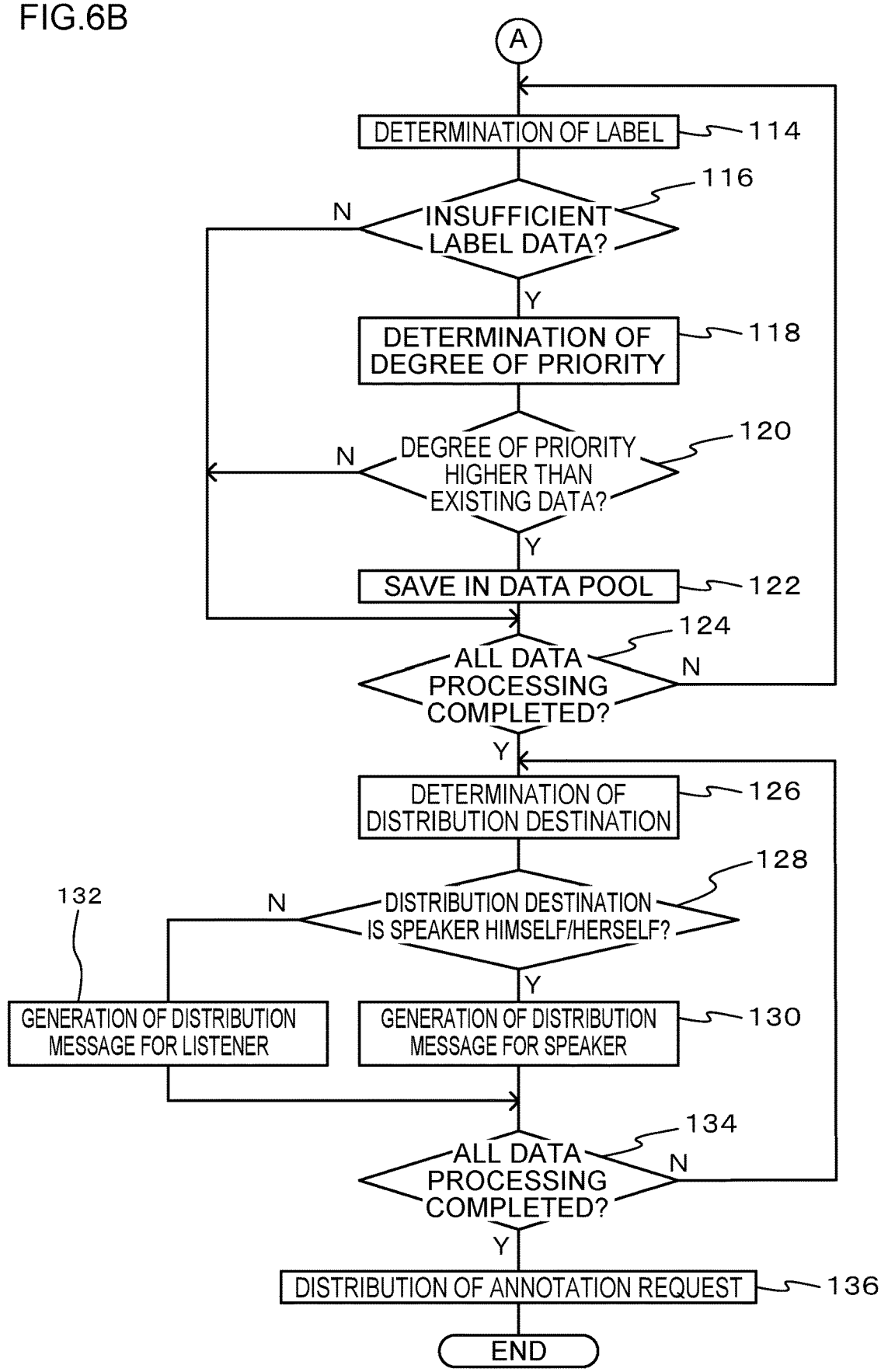
FIG. 6B is a second part flowchart of the flow in FIG. 6A.

Next, explanation follows regarding specific processing performed by the computer 11 such as the server of the information processing system 10 according to the present exemplary embodiment configured as described above. FIG. 6A and FIG. 6B are flowcharts illustrating an example of a flow of processing performed by the computer 11 of the information processing system 10 according to the present exemplary embodiment. Note that the processing of FIG. 6A and FIG. 6B is started in a case in which, for example, a user operates the computer 11 to acquire audio data from the sound recording device 12, and a request for start of annotation is instructed.

At step 100, the CPU 11A segments the audio data acquired from the sound recording device 12 into each instance of speech, and the processing transitions to step 102. Namely, the audio segmenting unit 14 segments audio data including a series of instances of speech into each instance of speech, and generates speech data in which audio is segmented into units of speech.

At step 102, the CPU 11A focuses on one segmented speech data, identifies the speaker of the speech data, and the processing transitions to step 104. Namely, the attribute determination section 28 identifies the speaker by determining the attributes of the input speech data.

At step 104, the CPU 11A determines whether or not the speech data is attribute insufficient speech data. In this determination, the insufficient data determination section 32 checks the attribute information determined by the attribute determination section 28 against the insufficient data managed by the insufficient data management section 30, and determines whether or not the speech data corresponds to insufficient data. In a case in which the determination is affirmative, the processing transitions to step 106, while in a case in which the determination is negative, the processing transitions to step 112.

At step 106, the CPU 11A determines the degree of priority of the speech data, and the processing transitions to step 108. Namely, the degree of priority determination section 34 determines the degree of priority by comparing the annotation candidate data held in the data pool section 36 with the degree of priority.

At step 108, the CPU 11A determines whether or not the degree of priority is higher than that of existing data. In this determination, the degree of priority determination section 34 determines whether or not the degree of priority is higher than the annotation candidate data held in the data pool section 36. In a case in which the determination is affirmative, the processing transitions to step 110, while in a case in which the determination is negative, the processing transitions to step 112.

At step 110, the CPU 11A saves the speech data in the data pool section 36 as annotation candidate data, and the processing transitions to step 112. Namely, the degree of priority determination section 34 replaces data having a lower degree of priority among the annotation candidate data which is held in the data pool section 36.

At step 112, the CPU 11A determines whether or not all of the data processing has been completed. This determination is performed by the output section 38 determining whether or not the processing of step 102 to step 110 has been completed for all of the segmented speech data. In a case in which the determination is negative, the processing returns to step 102 described above, and the above-described processing is performed focusing on the next speech data. On the other hand, in a case in which the determination is affirmative, the processing transitions to step 114.

At step 114, the CPU 11A focuses on one segmented speech data, determines the label of the speech data, and the processing transitions to step 116. Namely, the label determination section 40 uses the model for preliminary label determination to provisionally determine the label of the input speech data to be annotated, and outputs this as provisional label information.

At step 116, the CPU 11A determines whether or not the speech data is insufficient label speech data. This determination is performed by the insufficient label determination section 44 comparing the insufficient label information obtained from the insufficient label management section 42 with the provisional label information determined by the label determination section 40 to determine whether or not the speech data is insufficient label speech data. In a case in which the determination is affirmative, the processing transitions to step 118, while in a case in which the determination is negative, the processing transitions to step 124.

At step 118, the CPU 11A determines the degree of priority of the focused-on speech data, and the processing transitions to step 120. Namely, the degree of priority determination section 46 determines the degree of priority by comparing the speech data to be annotated which is held in the data pool section 48 with the degree of priority.

At step 120, the CPU 11A determines whether or not the degree of priority is higher than that of existing data. This determination is performed by the degree of priority determination section 46 determining whether or not the degree of priority is higher than that of the speech data to be annotated which is held in the data pool section 48. In a case in which the determination is affirmative, the processing transitions to step 122, while in a case in which the determination is negative, the processing transitions to step 124.

At step 122, the CPU 11A saves the speech data in the data pool section 48 as the speech data to be annotated, and the processing transitions to step 124. Namely, the degree of priority determination section 46 replaces data having a lower degree of priority among the speech data to be annotated which is held in the data pool section 48.

At step 124, the CPU 11A determines whether or not all of the data processing has been completed. This determination is performed by the output section 50 determining whether or not the processing of step 114 to step 122 has been completed for all of the segmented speech data. In a case in which the determination is negative, the processing returns to step 114 described above, and the above-described processing is performed focusing on the next speech data. On the other hand, in a case in which the determination is affirmative, the processing transitions to step 126.

At step 126, the CPU 11A focuses on one segmented speech data, determines the distribution destination of the speech data, and the processing transitions to step 128. Namely, the distribution destination determination section 52 refers to the conference participant information in the DB 16 to determine the conference participant who is the distribution destination of the speech data to be annotated.

At step 128, the CPU 11A determines whether or not the distribution destination is the speaker himself/herself. In this determination, the distribution destination determination section 52 determines whether or not the determined distribution destination is the speaker himself/herself. In a case in which the determination is affirmative, the processing transitions to step 130, while in a case in which the determination is negative, the processing transitions to step 132.

At step 130, the CPU 11A generates a speaker distribution message, and the processing transitions to step 134. Namely, the distribution content determination section 54 generates a distribution message for the speaker as the distribution content.

On the other hand, at step 132, the CPU 11A generates a listener distribution message, and the processing transitions to step 134. Namely, the distribution content determination section 54 generates a distribution message for the listener as the distribution content.

At step 134, the CPU 11A determines whether or not all of the data processing has been completed. This determination is performed by the output section 56 determining whether or not the processing of step 126 to step 132 has been completed for all of the segmented speech data. In a case in which this determination is negative, the processing returns to step 126 described above, and the above-described processing is performed focusing on the next speech data. On the other hand, in a case in which the determination is affirmative, the processing transitions to step 136.

At step 136, the CPU 11A distributes the annotation request, and ends the series of processing. Namely, the output section 56 outputs, to the UI 24, the distribution content determined by the distribution content determination section 54. The conference participant that received the annotation request then plays back the speech data and replies with an appropriate label on the UI 24 such as a chat tool.

As described above, in a case of annotation of a machine learning model that estimates a state of a party to a conversation from speech data of the conversation, the computer 11 of the information processing system 10 according to the present exemplary embodiment performs determination processing to determine whether or not the data is an insufficient predetermined annotation candidate, and in a case in which it is determined by the determination processing that the speech data is an insufficient predetermined annotation candidate, the computer 11 of the information processing system 10 performs request processing to request annotation from the party of the conversation, who is at least one of the speaker or the listener of the conversation. This enables annotation to be performed more accurately than in a case in which a third party annotates the conversation data.

Moreover, by determining a provisional label of the speech data of the conversation and using the provisional label to determine whether or not the speech data is an insufficient predetermined annotation candidate, it is possible to request annotation of only required data, enabling the burden on the user to be reduced.

Moreover, attribute determination is performed to determine the attributes of the speech data of the conversation, and whether or not the data is speech data of an insufficient predetermined annotation candidate is determined using the attributes and the provisional label, enabling the data for which annotation is requested to be further narrowed down and requested, further reducing the burden on the user.

Further, a destination of a request for annotation is determined based on the participant information of the conversation, and annotation is requested, enabling the request for annotation to be reliably requested with respect to a party to the conversation.

Note that in the above-described exemplary embodiments, although the audio segmenting unit 14, the DB 16, the data attribute determination unit 18, the preliminary label determination unit 20, and the annotation distribution unit 22 are described as functions executed by a single computer 11 such as a server, there is no limitation thereto. For example, the format may be configured by a computer such as a server including the functions of the audio segmenting unit 14, the data attribute determination unit 18, the preliminary label determination unit 20, and the annotation distribution unit 22, and a server including the functions of the DB 16. Alternatively, the respective functions of the audio segmenting unit 14, the DB 16, the data attribution determination unit 18, the preliminary label determination unit 20, and the annotation distribution unit 22 may be executed by different computers, or the respective functions may be provided separately among three or more computers, and executed in a coordinated manner among the computers.

Further, although explanation has been given regarding the processing performed by the computer 11 of the information processing system 10 in each of the above-described exemplary embodiments as software processing performed by executing a program, there is no limitation thereto. For example, the processing may be performed using hardware such as a graphics processing unit (GPU), an application specific integrated circuit (ASIC), or a field-programmable gate array (FPGA). Alternatively, both software and hardware may be combined in the processing. Further, in a case in which software processing is employed, the programs may be stored and distributed on various non-transitory storage media.

Moreover, the present disclosure is not limited to the above descriptions, and obviously various other modifications may be implemented within a range that does not depart from the gist of the present disclosure.

The present disclosure has been made in consideration of the above-described facts, and an object of the present disclosure is to provide an information processing device, and a non-transitory recording medium storing an information processing program, capable of accurately executing annotation, as compared to a case in which a third party performs annotation of conversation data.

A first aspect of the present disclosure is an information processing device, that includes: a memory; and a processor coupled to the memory, the processor being configured to: in a case of annotation of a machine learning model that estimates a state of a party to a conversation from speech data of the conversation, determine whether or not the speech data is an insufficient predetermined annotation candidate, and in a case in which it is determined that the speech data is an insufficient predetermined annotation candidate, request annotation from the party to the conversation, who is at least one of a speaker or a listener of the conversation.

In the first aspect, in a case of annotation of a machine learning model that estimates a state of a party to a conversation from speech data of the conversation, it is determined whether or not the speech data is an insufficient predetermined annotation candidate.

Moreover, in a case in which it is determined that the speech data is an insufficient predetermined annotation candidate, annotation is requested from the party to the conversation, who is at least one of a speaker or a listener of the conversation.

This enables annotation to be performed more accurately than in a case in which a third party annotates the conversation data.

A second aspect of the present disclosure is the information processing device according the first aspect, wherein the processor is further configured to: determine a provisional label for the speech data of the conversation; and using the provisional label, determine whether or not the speech data is an insufficient predetermined annotation candidate.

According to the second aspect, it is possible for annotation to be requested for only required data, enabling the burden on the user to be reduced.

A third aspect of the present disclosure is the information processing device according to the second aspect, wherein the processor is further configured to: determine an attribute of the speech data of the conversation; and using the attribute and the provisional label, determine whether or not the speech data is an insufficient predetermined annotation candidate.

According to the third aspect, the data for which annotation is requested can be further narrowed down and requested, enabling the burden on the user to be further reduced.

A fourth aspect of the present disclosure is the information processing device according to the first aspect, wherein the processor is further configured to: determine a destination of a request for annotation based on participant information of the conversation; and make the request for annotation to the destination.

According to the fourth aspect, it is possible to reliably make a request for annotation to a party to the conversation.

A fifth aspect of the present disclosure is a non-transitory recording medium storing an information processing program executable by a computer to perform processing. The processing includes: in a case of annotation of a machine learning model that estimates a state of a party to a conversation from speech data of the conversation, determining whether or not the speech data is an insufficient predetermined annotation candidate; and in a case in which it is determined that the speech data is an insufficient predetermined annotation candidate, requesting annotation from the party to the conversation, who is at least one of a speaker or a listener of the conversation.

According to the fifth aspect, it is possible to provide a non-transitory recording medium that stores an information processing program capable of accurately executing annotation, as compared to a case in which a third party performs annotation of conversation data.

As described above, the present disclosure enables the provision of an information processing device, and a non-transitory recording medium storing an information processing program, capable of accurately executing annotation, as compared to a case in which a third party performs annotation of conversation data.

The invention claimed is:

1. An information processing device, comprising:
a memory; and
a processor coupled to the memory, the processor being configured to:
segment audio data into instances of speech to generate speech data;
determines attributes of the speech data;
perform a first comparison between the determined attributes and previously stored insufficient data, and determine whether the speech data corresponds to insufficient data based on the first comparison;
determine a degree of priority of the speech data;
determine whether the degree of priority is higher than a priority of existing data;
upon determination that the degree of priority is higher than the priority of the existing data, determine a label for one segment of the speech data;
perform a second comparison between the determined label for the one segment of the speech data and predetermined insufficient label information, and determining whether the speech data is insufficient label speech data based on the second comparison;
upon determination that the speech data is insufficient label speech data, determine a distribution destination of the speech data;
determine whether the distribution destination of the speech data is a speaker of the speech data; and
upon determination that the distribution destination of the speech data is the speaker of the speech data, request annotation from the party to conversation associated with the speech data, who is at least one of a speaker or a listener of the conversation.

2. A non-transitory recording medium storing an information processing program executable by a computer to perform processing, the processing comprising:
segment audio data into instances of speech to generate speech data;
determines attributes of the speech data;
perform a first comparison between the determined attributes and previously stored insufficient data, and determine whether the speech data corresponds to insufficient data based on the first comparison;
determine a degree of priority of the speech data;
determine whether the degree of priority is higher than a priority of existing data;
upon determination that the degree of priority is higher than the priority of the existing data, determine a label for one segment of the speech data;
perform a second comparison between the determined label for the one segment of the speech data and predetermined insufficient label information, and determining whether the speech data is insufficient label speech data based on the second comparison;

upon determination that the speech data is insufficient label speech data, determine a distribution destination of the speech data;

determine whether the distribution destination of the speech data is a speaker of the speech data; and upon determination that the distribution destination of the speech data is the speaker of the speech data, requesting annotation from the party to conversation associated with the speech data, who is at least one of a speaker or a listener of the conversation.

* * * * *